US012657281B1

(12) United States Patent
Adamski et al.

(10) Patent No.: US 12,657,281 B1
(45) Date of Patent: Jun. 16, 2026

(54) SELECTIVELY ENABLING A JOINT TEST ACTION GROUP INTERFACE ON AN ENGINE CONTROL FOR AN AIRCRAFT ENGINE

(71) Applicant: RTX Corporation, Farmington, CT (US)

(72) Inventors: Paul A. Adamski, Westfield, MA (US); Jayashree Rajagopalan, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 348 days.

(21) Appl. No.: 17/891,772

(22) Filed: Aug. 19, 2022

(51) Int. Cl.
 *H04L 29/00* (2006.01)
 *B64D 31/00* (2006.01)
 *G06F 21/44* (2013.01)

(52) U.S. Cl.
 CPC ........... *G06F 21/445* (2013.01); *B64D 31/00* (2013.01)

(58) Field of Classification Search
 CPC .............................. G06F 21/445; B64D 31/00
 USPC ........................................................ 726/19
 See application file for complete search history.

(56) References Cited

U.S. PATENT DOCUMENTS 7,080,789 B2 * 7/2006 Leaming .......... G06K 19/07733
 714/E11.169
2017/0090909 A1 * 3/2017 Guo .......................... G06F 8/66

FOREIGN PATENT DOCUMENTS

CN 111143809 A 5/2020

* cited by examiner

*Primary Examiner* — Brandon Hoffman
*Assistant Examiner* — Michael D Anderson
(74) *Attorney, Agent, or Firm* — CANTOR COLBURN LLP

(57) ABSTRACT

Examples described herein provide a method that includes providing a joint test action group interface of an engine control, the joint test action group interface being in a disabled state to prevent a device connected to the joint test action group interface from communicating with the engine control. The method further includes detecting whether a control access card is inserted into a port of the engine control. The method further includes, responsive to detecting that the control access card is inserted into the port of the engine control, performing an authentication using a credential stored on the control access card. The method further includes, responsive to successfully completing the authentication, enabling the joint test action group interface of the engine control to enable the device connected to the joint test action group interface to communicate with the engine control.

20 Claims, 3 Drawing Sheets

300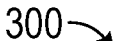

302

┌─────────────────────────────────────────┐
│ Disable a joint test action group interface of an │
│ engine control to prevent a device connected to │
│ the joint test action group interface from │
│ communicating with the engine control │
└─────────────────────────────────────────┘

304

No ◁ Detect CAC ? ▷

Yes

306

┌─────────────────────────────────────────┐
│ Authenticate using credentials stored on the │
│ control access card │
└─────────────────────────────────────────┘

308

No ◁ Authorization successful ? ▷

Yes

310

┌─────────────────────────────────────────┐
│ Enable the joint test action group interface of the │
│ engine control to enable the device connected │
│ to the joint test action group interface to │
│ communicate with the engine control │
└─────────────────────────────────────────┘

FIG. 3

SELECTIVELY ENABLING A JOINT TEST ACTION GROUP INTERFACE ON AN ENGINE CONTROL FOR AN AIRCRAFT ENGINE

BACKGROUND

The subject matter disclosed herein generally relates to engine controls for aircraft engines and more particularly to selectively enabling a joint test action group interface on an interface control for an aircraft engine.

Aircraft engines can be controlled and monitored using one or more distributed control systems, which can include controller(s), sensor(s), actuator(s), and/or the like, including combinations and/or multiples thereof. For example, a sensor (e.g., temperature sensor) can monitor an aspect of the aircraft engine (e.g., temperature), can analyze data received from the sensor (e.g., temperature data), and can control an aspect of the aircraft engine (e.g., bleed air port) based on the data received from the sensor (e.g., temperature data).

BRIEF DESCRIPTION

In one exemplary embodiment, a method is provided. The method includes providing a joint test action group interface of an engine control, the joint test action group interface being in a disabled state to prevent a device connected to the joint test action group interface from communicating with the engine control. The method further includes detecting whether a control access card is inserted into a port of the engine control. The method further includes, responsive to detecting that the control access card is inserted into the port of the engine control, performing an authentication using a credential stored on the control access card. The method further includes, responsive to successfully completing the authentication, enabling the joint test action group interface of the engine control to enable the device connected to the joint test action group interface to communicate with the engine control.

In addition to one or more of the features described herein, or as an alternative, further embodiments of the method may include detecting whether the control access card is removed from the port of the engine control.

In addition to one or more of the features described herein, or as an alternative, further embodiments of the method may include, responsive to detecting that the control access card is removed from the port of the engine control, disabling the joint test action group interface of the engine control.

In addition to one or more of the features described herein, or as an alternative, further embodiments of the method may include, responsive to unsuccessfully completing the authentication, disabling the joint test action group interface of the engine control to prevent the device connected to the joint test action group interface from communicating with the engine control.

In addition to one or more of the features described herein, or as an alternative, further embodiments of the method may include that the authentication compares first security data stored on the control access card with second security data stored on the engine control.

In addition to one or more of the features described herein, or as an alternative, further embodiments of the method may include that the authentication is successful responsive to the first security data matching the second security data.

In addition to one or more of the features described herein, or as an alternative, further embodiments of the method may include that the authentication is unsuccessful responsive to the first security data not matching the second security data.

In addition to one or more of the features described herein, or as an alternative, further embodiments of the method may include that the authentication is performed using a blockchain.

In addition to one or more of the features described herein, or as an alternative, further embodiments of the method may include that the port is a universal serial bus port.

In another exemplary embodiment an engine control is provided and includes a joint test action group interface, a port, a memory including computer readable instructions, and a processing device for executing the computer readable instructions. The computer readable instructions control the processing device to perform operations. The operations include disabling the joint test action group interface to prevent a device connected to the joint test action group interface from communicating with the engine control. The operations further include detecting whether a control access card is inserted into the port. The operations further include, responsive to detecting that the control access card is inserted into the port, performing an authentication using a credential stored on the control access card. The operations further include, responsive to successfully completing the authentication, enabling the joint test action group interface of the engine control to enable the device connected to the joint test action group interface to communicate with the engine control.

In addition to one or more of the features described herein, or as an alternative, further embodiments of the engine control may include that the operations further include detecting whether the control access card is removed from the port of the engine control.

In addition to one or more of the features described herein, or as an alternative, further embodiments of the engine control may include that the operations further include, responsive to detecting that the control access card is removed from the port of the engine control, disabling the joint test action group interface of the engine control.

In addition to one or more of the features described herein, or as an alternative, further embodiments of the engine control may include that the operations further include, responsive to unsuccessfully completing the authentication, disabling the joint test action group interface of the engine control to prevent the device connected to the joint test action group interface from communicating with the engine control.

In addition to one or more of the features described herein, or as an alternative, further embodiments of the engine control may include that the authentication compares first security data stored on the control access card with second security data stored on the engine control.

In addition to one or more of the features described herein, or as an alternative, further embodiments of the engine control may include that the authentication is successful responsive to the first security data matching the second security data.

In addition to one or more of the features described herein, or as an alternative, further embodiments of the engine control may include that the authentication is unsuccessful responsive to the first security data not matching the second security data.

In addition to one or more of the features described herein, or as an alternative, further embodiments of the engine control may include that the authentication is performed using a blockchain.

In addition to one or more of the features described herein, or as an alternative, further embodiments of the engine control may include that the port is a universal serial bus port.

In yet another exemplary embodiment a computer program product includes a computer readable storage medium having program instructions embodied therewith. The program instructions are executable by a processor to cause the processor to perform operations. The operations include disabling a joint test action group interface of an engine control to prevent a device connected to the joint test action group interface from communicating with the engine control. The operations include detecting whether a control access card is inserted into a port of the engine control. The operations include, responsive to detecting that the control access card is inserted into the port of the engine control, performing an authentication using a credential stored on the control access card. The operations include, responsive to successfully completing the authentication, enabling the joint test action group interface of the engine control to enable the device connected to the joint test action group interface to communicate with the engine control.

In addition to one or more of the features described herein, or as an alternative, further embodiments of the computer program product may include that the operations further include detecting whether the control access card is removed from the port of the engine control, and responsive to detecting that the control access card is removed from the port of the engine control, disabling the joint test action group interface of the engine control.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike:

FIG. 3 is a flow diagram of a method for selectively enabling a joint test action group interface on an interface control for an aircraft engine according to one or more embodiments described herein.

DETAILED DESCRIPTION

A detailed description of one or more embodiments of the disclosed apparatus and method are presented herein by way of exemplification and not limitation with reference to the Figures.

Figure 1:
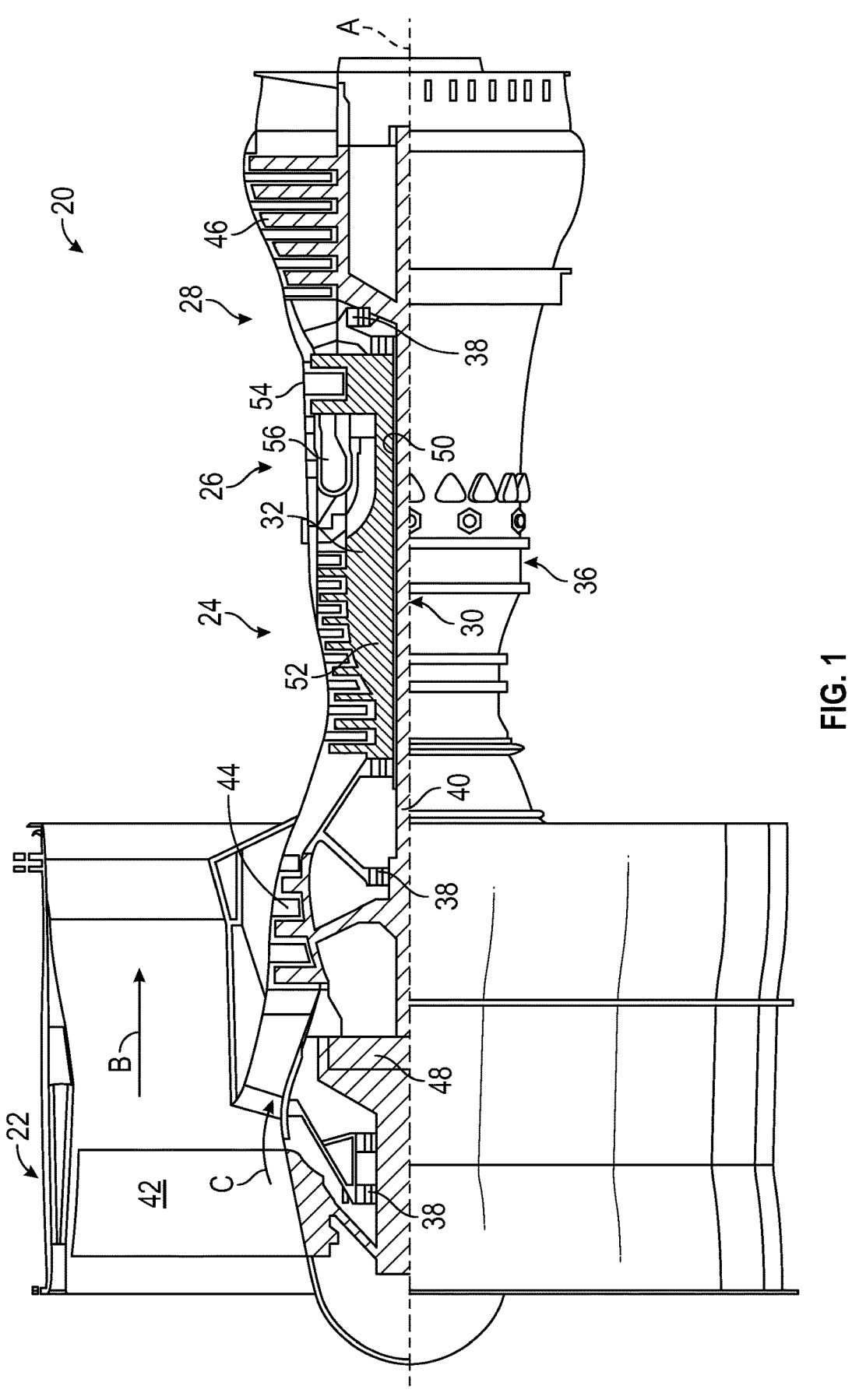
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)] 0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
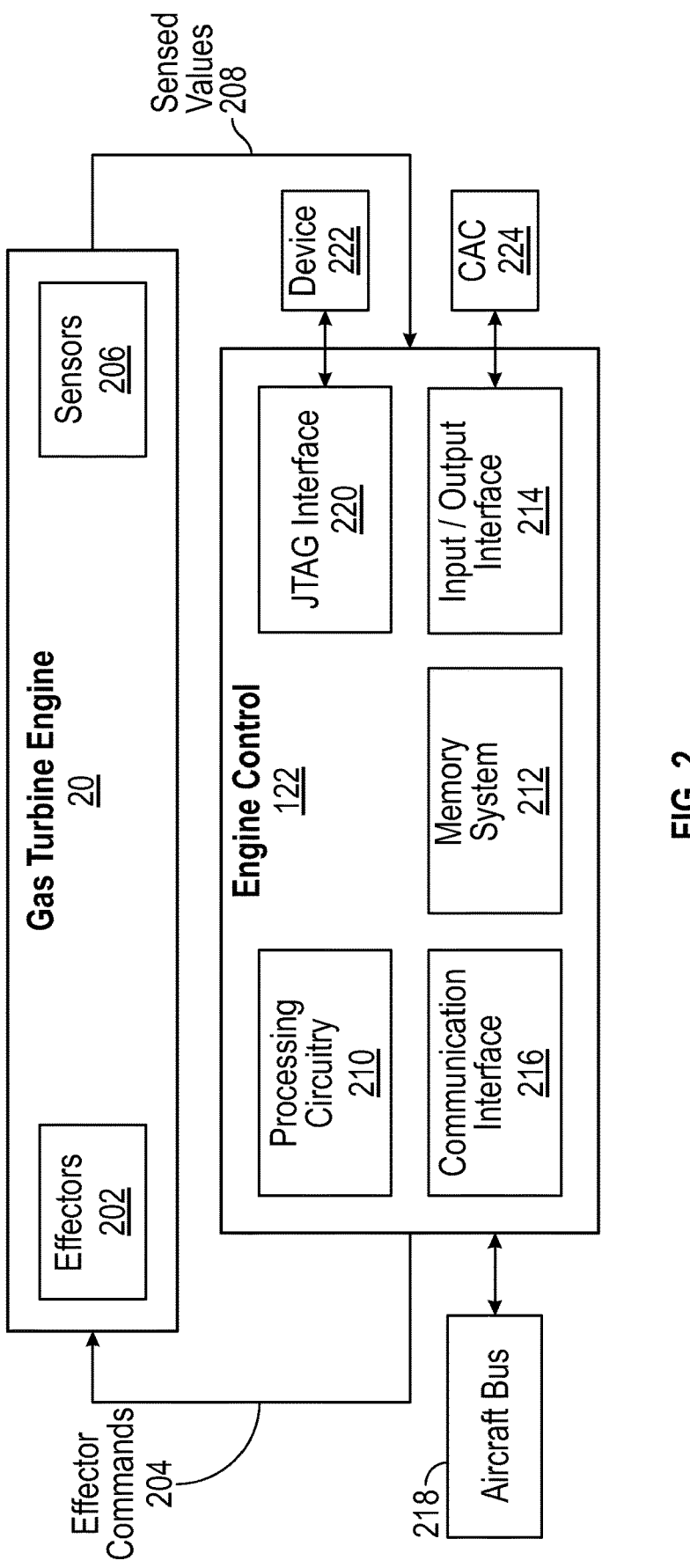
FIG. 2 depicts an example of an engine control configured to monitor and control operation of a gas turbine engine in real-time (or near-real time) according to one or more embodiments described herein.

FIG. 2 depicts an example of an engine control 122 configured to monitor and control operation of a gas turbine engine (e.g., the gas turbine engine 20) in real-time (or near-real time) according to one or more embodiments described herein. The engine control 122 can control effectors 202 of the gas turbine engine 20 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 20 and provide sensed values 208 as feedback to the engine control 122 to enable closed-loop control of the gas turbine engine 20 according to one or more control laws. Examples of the sensors 206 can include one or more temperature sensors, pressure sensors, strain gauges, speed sensors, accelerometers, lube sensors, and the like.

The engine control 122 (also referred to as a "controller") can be a full authority digital engine control (FADEC) that includes processing circuitry 210 (also referred to as a "processing device") and a memory system 212 configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources, such as discrete inputs/outputs and/or status signals. The communication interface 216 may communicate with an aircraft bus 218 of an aircraft. The aircraft bus 218 can provide aircraft-level parameters and commands that are used by the engine control 122 to control the gas turbine engine 20 in real-time. The communication interface 216 may also support communication with other components, such as other instances of the engine control 122, storage units, diagnostic units, communication adapters, off-board systems, and the like.

According to an embodiment, the engine control 122 also includes a joint test action group (JTAG) interface 220. The JTAG interface 220 is useful for the debug and development of digital electronic components, such as the engine control 122 and/or its components. For example, a device 222 can be communicatively coupled to the JTAG interface 220. However, conventional JTAG tag interfaces are unsecure. The conventional approach to securing a conventional JTAG interface is to disable it, which eliminates its usefulness because the device 222 cannot communicate with the engine control 122 via the JTAG interface 220. One or more embodiments described herein address this and other shortcomings by selectively enabling the JTAG interface 220 in a secure way using a control access card (CAC) 224. This enables the JTAG interface 220 to be fully secured without impacting debug and/or development capabilities.

According to an embodiment, the JTAG interface 220 is selectively enabled using the CAC 224. For example, the CAC 224 can be inserted into a port of the engine control 122 (e.g., the input/output interface 214). As an example, the port receiving the CAC 224 can be a universal serial bus (USB) port. The CAC 224 provides cryptographic credentials used to enable JTAG functionality of the JTAG interface 220. For example, when no CAC is inserted into the port of the engine control 122, the JTAG functionality of the JTAG interface 220 is disabled and remains disabled until a CAC (e.g., the CAC 224) is inserted into the port of the engine control 122 and successfully authenticated. According to one or more embodiments described herein, the authentication is performed using a shared secret approach, where each of the engine control 122 and the CAC 224 include a piece of information or "credential" (e.g., a password, a passphrase, a hash value, and/or the like, including combinations and/or multiples thereof) known only to each of the engine control 122 and the CAC 224. For example, each of the engine control 122 and the CAC 224 include security data (e.g., a password, a passphrase, a hash value, and/or the like, including combinations and/or multiples thereof), and the CAC 224 is successfully authenticated when the security data for the CAC 224 matches the security data for the engine control 122.

According to one or more embodiments described herein, the authentication is performed using blockchain (e.g., the Ethereum blockchain). For example, a digital ledger can be shared between the CAC 224 and the engine control 122, and the authentication is performed using information stored in the digital ledger.

According to one or more embodiments described herein, the JTAG interface 220 intercepts and buffers signals from the device 222 and allows pass through of such signals when the CAC 224 is inserted and authorized.

FIG. 3 is flow diagram of a method 300 for selectively enabling a joint test action group interface on an interface control for an aircraft engine according to one or more embodiments described herein. The method 300 can be implemented by any suitable system/device, such as the engine control 122, which can be a FADEC or the like.

At block 302, the JTAG interface 220 is in a disabled state to prevent the device 222 connected to the JTAG interface 220 from communicating with the engine control 122. According to one or more embodiments, the engine control 122 disables the JTAG interface 220 to prevent the device 222 connected to the JTAG interface 220 from communicating with the engine control 122.

At decision block 304, the engine control 122 detects whether the CAC 224 is inserted into a port (e.g., the input/output interface 214) of the engine control 122. As an example, the port is a USB port. If the CAC 224 is not detected (decision block 304 "no"), the detecting at decision block 304 continues. If the CAC 224 is detected at decision block 304 (decision block 304 "yes"), the method 300 proceeds to block 306.

At block 306, the engine control 122 performs an authentication using a credential stored on the CAC 224. The authentication can be a shared secret technique, a blockchain-based technique, and/or the like, including combinations and/or multiples thereof. According to one or more embodiments described herein, the authentication compares first security data stored on the CAC 224 with second security data stored on the engine control. In such embodiments, the authentication is successful responsive to the first security data matching the second security data. Conversely, the authentication is unsuccessful responsive to the first security data not matching the second security data. According to one or more embodiments described herein, the authentication is performed using a blockchain (e.g., a distributed ledger shared between the engine control 122 and the CAC 224).

At decision block 308, the engine control 122 determines whether the authentication is successful. If it is determined that the authentication is unsuccessful (decision block 308 "no"), the method 300 returns to block 302, and the JTAG interface 220 of the engine control 122 is disabled to prevent the device 222 connected to the JTAG interface 220 from communicating with the engine control 122. If, however, it is determined that the authentication is successful (decision block 308 "yes"), the method 300 proceeds to block 310.

At block 310, responsive to successfully completing authentication, the engine control 122 enables the JTAG interface 220 of the engine control 122 to enable the device 222 connected to the JTAG interface 220 to communicate with the engine control 122.

Additional processes also may be included. For example, the method 300 can include detecting whether the CAC 224 is removed from the port of the engine control 122. Responsive to detecting that the CAC 224 is removed from the port of the engine control 122, the engine control 122 disables the JTAG interface 220 f the engine control 118. It should be understood that the process depicted in FIG. 3 represents an illustration, and that other processes may be added or existing processes may be removed, modified, or rearranged without departing from the scope of the present disclosure.

One or more embodiments described herein represents an improvement to the functioning of the engine control by preventing unauthorized access to the engine control by a device until authorization is performed using a control access card. This improves conventional techniques which simply disable the JTAG interface and do not provide for using the JTAG interface. In contrast, one or more embodiments described herein selectively enable the JTAG interface based on an authorization performed using the CAC. This enables additional functionality of the engine control (e.g., using the JTAG interface for development and debugging) while preventing unauthorized access to the engine control via the JTAG interface.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
   providing a joint test action group interface of an engine control, the joint test action group interface being in a disabled state to prevent a device connected to the joint test action group interface from communicating with the engine control;
   detecting whether a control access card is inserted into a port of the engine control;

responsive to detecting that the control access card is inserted into the port of the engine control, performing an authentication using a credential stored on the control access card; and responsive to successfully completing the authentication, enabling the joint test action group interface of the engine control to enable the device connected to the joint test action group interface to communicate with the engine control, wherein, when operating in the disabled state, the joint test action group interface intercepts and buffers signals from the device to prevent the device from communicating with the engine control.

2. The method of claim 1, further comprising detecting whether the control access card is removed from the port of the engine control.

3. The method of claim 2, further comprising, responsive to detecting that the control access card is removed from the port of the engine control, disabling the joint test action group interface of the engine control, wherein the JTAG interface intercepts and buffers signals from the device in response to operating in the disable state when the control access card is removed from the port, and allows pass through of the signals in response to successfully completing the authentication when the control access card is inserted into the port.

4. The method of claim 1, further comprising, responsive to unsuccessfully completing the authentication, disabling the joint test action group interface of the engine control to completely prevent the device connected to the joint test action group interface from communicating with the engine control.

5. The method of claim 1, wherein the authentication compares first security data stored on the control access card with second security data stored on the engine control.

6. The method of claim 5, wherein the authentication is successful responsive to the first security data matching the second security data.

7. The method of claim 5, wherein the authentication is unsuccessful responsive to the first security data not matching the second security data.

8. The method of claim 1, wherein the authentication is performed using a blockchain.

9. The method of claim 1, wherein the port is a universal serial bus port.

10. An engine control comprising:
a joint test action group interface;
a port;
a memory comprising computer readable instructions; and
a processing device for executing the computer readable instructions, the computer readable instructions controlling the processing device to perform operations comprising:
    disabling the joint test action group interface to prevent a device connected to the joint test action group interface from communicating with the engine control;
    detecting whether a control access card is inserted into the port;
    responsive to detecting that the control access card is inserted into the port, performing an authentication using a credential stored on the control access card; and
    responsive to successfully completing the authentication, enabling the joint test action group interface of the engine control to enable the device connected to the joint test action group interface to communicate with the engine control,
    wherein, when operating in the disabled state, the joint test action group interface intercepts and buffers signals from the device to prevent the device from communicating with the engine control.

11. The engine control of claim 10, the operations further comprising detecting whether the control access card is removed from the port of the engine control.

12. The engine control of claim 11, the operations further comprising, responsive to detecting that the control access card is removed from the port of the engine control, disabling the joint test action group interface of the engine control, wherein the JTAG interface intercepts and buffers signals from the device in response to operating in the disable state when the control access card is removed from the port, and allows pass through of the signals in response to successfully completing the authentication when the control access card is inserted into the port.

13. The engine control of claim 10, the operations further comprising, responsive to unsuccessfully completing the authentication, disabling the joint test action group interface of the engine control to completely prevent the device connected to the joint test action group interface from communicating with the engine control.

14. The engine control of claim 10, wherein the authentication compares first security data stored on the control access card with second security data stored on the engine control.

15. The engine control of claim 14, wherein the authentication is successful responsive to the first security data matching the second security data.

16. The engine control of claim 14, wherein the authentication is unsuccessful responsive to the first security data not matching the second security data.

17. The engine control of claim 10, wherein the authentication is performed using a blockchain.

18. The engine control of claim 10, wherein the port is a universal serial bus port.

19. A computer program product comprising a computer readable storage medium having program instructions embodied therewith, the program instructions executable by a processor to cause the processor to perform operations comprising:
    disabling a joint test action group interface of an engine control to prevent a device connected to the joint test action group interface from communicating with the engine control;
    detecting whether a control access card is inserted into a port of the engine control;
    responsive to detecting that the control access card is inserted into the port of the engine control, performing an authentication using a credential stored on the control access card; and
    responsive to successfully completing the authentication, enabling the joint test action group interface of the engine control to enable the device connected to the joint test action group interface to communicate with the engine control,
    wherein, when operating in the disabled state, the joint test action group interface intercepts and buffers signals from the device to prevent the device from communicating with the engine control.

20. The computer program product of claim 19, the operations further comprising detecting whether the control access card is removed from the port of the engine control, and responsive to detecting that the control access card is removed from the port of the engine control, disabling the joint test action group interface of the engine control.

\* \* \* \* \*